(12) United States Patent
Jackiewicz et al.

(10) Patent No.: US 8,645,323 B2
(45) Date of Patent: Feb. 4, 2014

(54) LARGE VOLUME DATA REPLICATION USING JOB REPLICATION

(75) Inventors: Waldemar Jackiewicz, Halinow (PL); Vito Losacco, Ardea (IT); Andrzej Nazaruk, Warsaw (PL); Mahesh Viswanathan, Yorktown Heights, NY (US); Maciej Wielgus, Gliwice (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/442,947

(22) Filed: Apr. 10, 2012

(65) Prior Publication Data

US 2013/0268488 A1    Oct. 10, 2013

(51) Int. Cl.
*G06F 17/30* (2006.01)

(52) U.S. Cl.
USPC .......................................... 707/624; 707/674

(58) Field of Classification Search
USPC ................................................. 707/624, 674
See application file for complete search history.

(56) References Cited

U.S. PATENT DOCUMENTS

| | | | |
|---|---|---|---|
| 7,363,541 B2 | 4/2008 | Haagens et al. | |
| 7,734,950 B2 | 6/2010 | Rogers | |
| 7,801,851 B2 * | 9/2010 | Holenstein et al. | ........... 707/615 |
| 7,802,137 B2 | 9/2010 | Kawamura et al. | |
| 2005/0235017 A1 | 10/2005 | Ashman | |
| 2006/0179082 A1 * | 8/2006 | Boyd et al. | ..................... 707/203 |
| 2008/0256384 A1 | 10/2008 | Branson et al. | |
| 2009/0240744 A1 | 9/2009 | Thomson et al. | |

OTHER PUBLICATIONS

IBM iCluster [online], 2 pages, [retrieved on Sep. 20, 2011], Retrieved from the Internet: < URL: http://www-03.ibm.com/systems/power/software/availability/icluster/>.
IBM iCLuster for i, Protect your data with real-time data replication, IBM, 2008, 4 pages.
Network Job Entry (NJE) [online] May 6, 2004, SearchNetworking.com, [retrieved on Sep. 20, 2011], Retrieved from the Internet: < URL: http://searchnetworking.techtarget.com/sDefinition/0.sid7_gci963051.00.html> 1 page.
Remote Job Entry (RJE), [online] Jun. 14, 2004, SeachDataCenter.com, [retrieved on Sep. 20, 2011], Retrieved from the Internet:< URL: http://searchdatacenter.techtarget.com/definition/Remote-Job-Entry> 1 page.

(Continued)

*Primary Examiner* — Jacob F Bétit
*Assistant Examiner* — Kristopher Andersen
(74) *Attorney, Agent, or Firm* — Schmeiser, Olsen & Watts; John Pivnichny (57) ABSTRACT

An approach for replicating data is provided. A job that modifies data objects in a first system to generate a first set of changed data objects is determined to be a candidate for a job replication. Based on the job being a candidate for job replication, attributes of the job are retrieved, the retrieved attributes are sent to a second system, and an execution of the job by the second system is initiated as part of the job replication. The execution of the job causes data objects included in the second system to be modified to generate a second set of changed data objects as a replication of the first set of changed data objects.

16 Claims, 5 Drawing Sheets

(56) References Cited

OTHER PUBLICATIONS

High Availability for IBM i, Technology and Topology choices for ensuring resilience and data integrity, Vision Solutions, 2011, 27 pages.

MIMIX Availability, [online] [Retrieved in 2011] 3 pages, Retrieved from the Internet:< URL: htp://www.visionsolutions.com/Products/High-Availability-MIMIX.aspx>.

iTERA Availability, [online] [Retrieved in 2011] 2 pages, Retrieved from the Internet:< URL: pdf.visionsolutions.com/pdfs/us-itera-availability.pdf>.

High Availability Suite, Maxava 2011, 4 pages.

Limaye et al., Job-Site Level Fault Tolerance for Cluster and Grid environments, IEEE International Conference on Cluster Computing, 2005, 9 pages.

Chris Hird, Remote Journaling and Data Recovery, Shield Advanced Solutions, 2002, 23 pages.

Zhu Jianfeng, A duplicate-aware data replication, 2008 Japan-China Joint Workshop on Frontier of Computer Science and Technology, 978-0-7695-3540-1/08, DOI 10.1109/FCST.2008.34, pp. 112-117.

Christoph Mitasch, Server-Based Wide Area Data Replication for Disaster Recovery, Jun. 2004, Diploma thesis, University of Applied Sciences Hagenberg, 104 pages.

* cited by examiner

LARGE VOLUME DATA REPLICATION USING JOB REPLICATION

TECHNICAL FIELD

The present invention relates to a data processing method and system for managing data replication, and more particularly to a technique for managing a replication of a large volume of data over a wide area network.

BACKGROUND

Data replication is a scheme by which data is copied from one site (i.e., a source) to another site (i.e., a target) and synchronizing the data at both sites. Many high availability and disaster recovery solutions for known computing platforms are based on logical data replication. Logical data replication is a method of replicating data by detecting object changes at the source site, sending information about the changes (i.e., changed records) to the target site, and applying the changes at the target site. The amount of time needed for logical data replication is based on data transferring time and data applying time and is highly dependent on available link bandwidth and latency. Existing logical replication solutions include a set of audit tools that checks if the source and target sites are synchronized, thereby checking if traditional data replication works correctly. The synchronization may be performed by fast comparisons of object attributes, database record counts, etc., or by more reliable data comparisons, which consume more resources and time. To speed up data comparisons, only randomly selected parts of data can be compared. Typically, comparisons are performed on a regular basis (e.g., fast comparisons are done daily and data comparisons are done weekly).

BRIEF SUMMARY

In a first embodiment, the present invention provides a method of replicating data. The method comprises the steps of:

a first computer system determining a job is a candidate for a job replication, the job modifies data objects in the first computer system to generate a first set of changed data objects;

based on the job being the candidate for the job replication, the first computer system initiating the job replication by retrieving attributes of the job;

subsequent to retrieving attributes of the job, the first computer system sending the attributes to a second computer system via a computer network as a part of the job replication, without utilizing a data replication to send the data objects or the first set of changed data objects to the second computer system; and the first computer system initiating an execution of the job by the second computer system based on the sent attributes as another part of the job replication, the execution of the job causing the data objects included in the second computer system to be modified to generate a second set of changed data objects as a replication of the first set of changed data objects.

A system, program product and a process for supporting computing infrastructure where the process provides at least one support service are also described and claimed herein, where the system, program product and process for supporting computing infrastructure correspond to the aforementioned method.

Embodiments of the present invention reduce data transferring time and the amount of data transferred during data replication of a large volume of data over a wide area network, thereby decreasing data transferring and data applying delays that appear when only traditional data replication approaches replicate the large volume of data. Job replication described herein is less prone to transportation latency than traditional data replication, and therefore is effective even via a satellite link. Using embodiments of the present invention, all data needed for service restoration in case of a disaster can be delivered faster to a target system, therefore shortening the Recovery Point Objective. Embodiments of the present invention may provide flexibility by allowing the option to balance the cost of network parameters (e.g., bandwidth and latency for data replicated by known data replication approaches) against target system processing resources (e.g., central processing unit, random access memory and input/output subsystem resources for data synchronized by job replication).

DETAILED DESCRIPTION

Overview

Embodiments of the present invention replicate data by supplementing known techniques of data replication with job replication as an alternative option in configurations that may replicate large volumes of data over a computer network (e.g., a wide area network (WAN)), such as in high availability (HA) configurations. The present invention may replicate a job environment of a job to a target system (i.e., remote system) as a set of instructions instead of directly transferring data over the network from the source system to the target system. Therefore, instead of transferring data directly to the target system, the present invention may "pseudo" transfer the data as the set of instructions to be implemented on the target system. Subsequently, the present invention may use the replicated job environment (i.e., the set of instructions) to execute the job on the target system to generate the aforementioned data on the target system. The replication of the job environment includes transferring job parameters (i.e., job attributes) to the target system instead of transferring data to the target system, thereby reducing the amount of data transferred to the target system, and allowing a user to balance the need for network bandwidth for replication with the utilization of processing resources of the target system.

For example, instead of using an existing data replication approach to replicate 100 gigabytes (GB) of data by transferring the 100 GB of data from a production system to a backup system, the present invention replicates job attributes from the production system to the backup system, where the replicated job attributes are only a few kilobytes (KB) in size. Thus, in this example, the existing approach's transfer of the 100 GB of data is advantageously replaced with a transfer of a significantly smaller volume of data (i.e., the few KB of data comprising the job attributes).

System for Replicating Data Using Job Replication

Figure 1A:
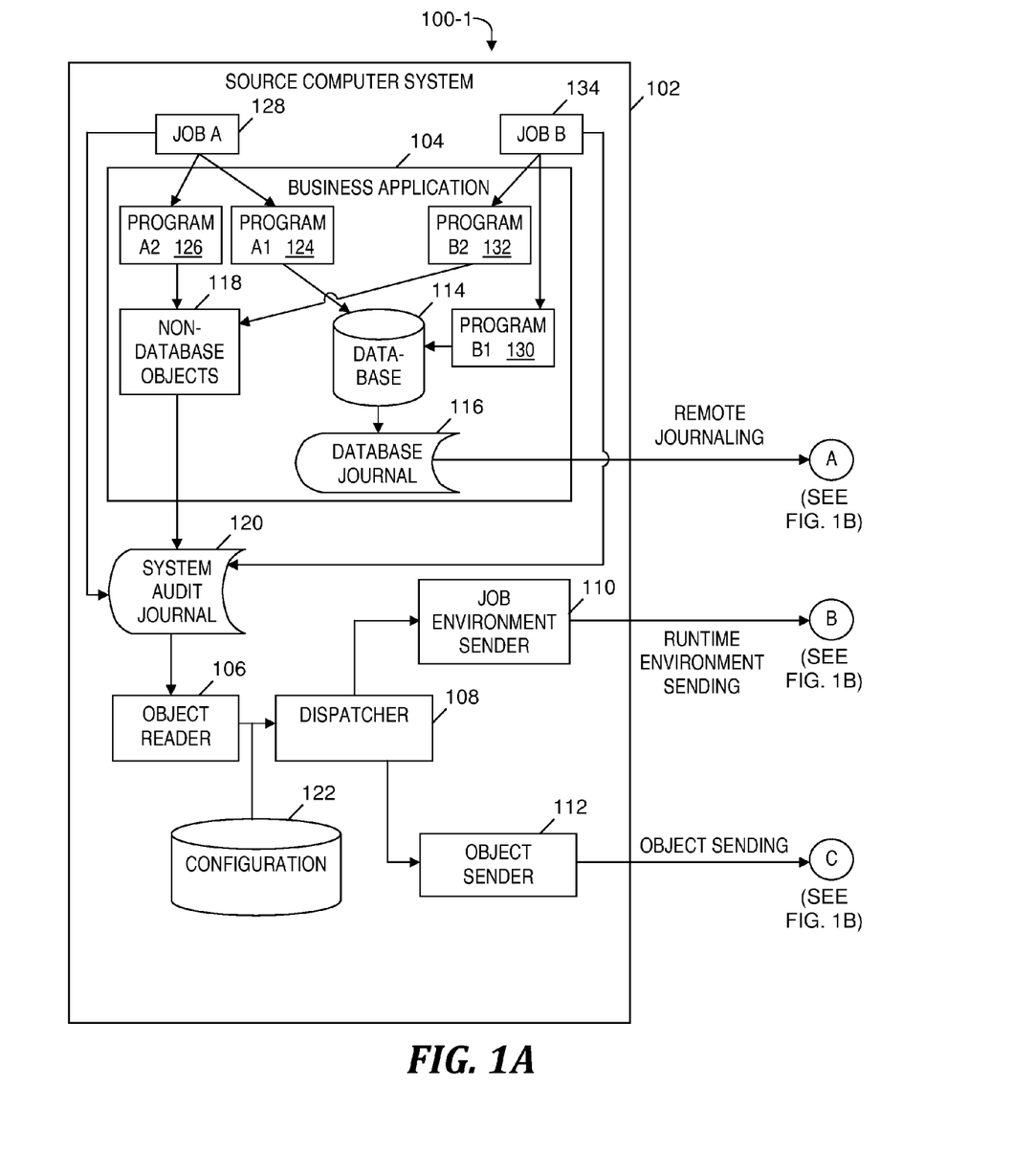
FIGS. 1A-1B depict a block diagram of a system for replicating data, in accordance with embodiments of the present invention.
Figure 1B:
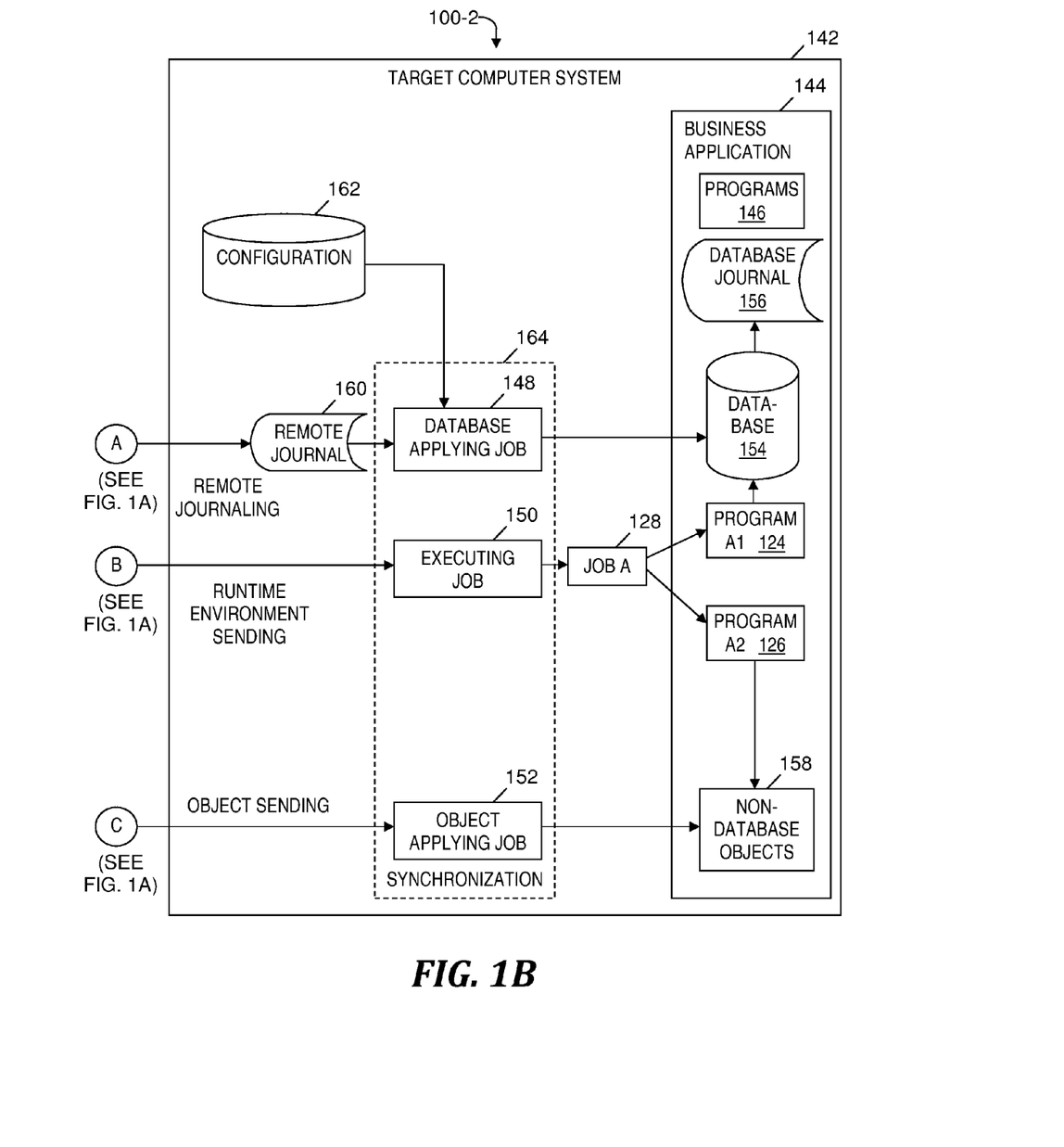

FIGS. 1A-1B depict a block diagram of a system for replicating data, in accordance with embodiments of the present invention. The system for replicating data may include a first portion 100-1 (see FIG. 1A) and a second portion 100-2 (see FIG. 1B). The portion 100-1 of the system includes a source computer system 102, which runs a software-based business application 104. The portion 100-1 of the system for replicating data also includes the following software-based modules: object reader 106, dispatcher 108, job environment sender 110, and object sender 112. Portion 100-1 of the system for replicating data further includes a database 114, a database journal 116, non-database objects 118, a system audit journal 120, and a configuration 122, which are stored on one or more computer data storage media included in source computer system 102. In an alternate embodiment, any of the aforementioned one or more computer data storage media may be external to and coupled to source computer system 102.

Source computer system 102 may execute one or more jobs, each executing job running a respective set of one or more programs in business application 104. As used herein, a job is defined as a process on an operating system level, and is equivalent to a "job" in an i5/OS® operating system, a "process" in a UNIX® operating system and a "task" in a WINDOWS® operating system. A job (e.g., job 128) implemented in source computer system 102 may run one program (e.g., program 126) that changes one or more non-database objects 118 and another program (e.g., program 124) that changes one or more data items in database 114.

As used herein, a non-database object is defined as an object that cannot be replicated based on transaction log replication (e.g., "remote journaling" provided by an i5/OS® operating system or "log shipping" provided by an SQL Server® relational database server), and may include, for example, stream files, program objects, and executable binaries.

As an example, portion 100-1 of the system for replicating data depicts business application 104 as running program A1 124 and program A2 126, which are computer programs run as part of an execution of job A 128 by source computer system 102, and further depicts business application 104 as running program B1 130 and program B2 132, which are computer programs run as part of an execution of job B 134 by source computer system 102. Job A 128 and job B 134 are implemented in source computer system 102.

Although source computer system 102 is shown in FIG. 1A as executing two jobs (i.e., job 128 and job 134), another embodiment may have the source computer system 102 executing another number of one or more jobs. Although each of jobs 128 and 134 are shown in FIG. 1A as running exactly two programs, the present invention contemplates that each job may run any number of one or more programs. Furthermore, in other embodiments, one job may run one number of programs in business application 104 while another job may run another number of programs in business application 104.

Database journal 116 includes a transaction log that stores a description of each transaction that changes a data item in database 114, where each transaction is performed by a respective job (e.g., job 128) running a respective program (e.g., program 124). Source computer system 102 runs a remote journaling function to transfer the transaction log included in database journal 116, which is described in more detail below in the discussions relative to FIG. 1B and FIGS. 2A-2B.

System audit journal 120 includes attributes of the jobs (e.g., job 128 and job 134) executed by source computer system 102. The attributes may include library lists, user profiles, the commands executed to run the jobs, entries sequence, job priorities, job descriptions, and job queues.

Configuration 122 includes a new table of data that specifies how data change(s) made by a specific job are to be replicated. That is, configuration 122 associates identifiers of jobs with respective indicators of whether or not the identified job is a candidate for job replication. An identifier of a job may include a job name and a user name. A job being a candidate for job replication indicates that the change(s) in data made by the execution of the job are suitable for job replication according to predefined criteria which are described below relative to the discussion of FIGS. 2A-2B. As one example, an application administrator defines which jobs are candidates for job replication, and these definitions are received by source computer system 102 and stored in configuration 122.

Based on the indicator that configuration 122 associates with a specific job, dispatcher 108 decides whether change(s) to data object(s) resulting from the job and read by object reader 106 are replicated by (1) the job environment sender 110 transferring attributes of the job retrieved from system audit journal 120 (i.e., runtime environment sending) instead of transferring the data objects or the data object changes, or (2) the object sender 112 transferring the data objects using a known data replication approach (i.e., object sending). The runtime environment sending and object sending are described in more detail below in the discussions relative to FIG. 1B and FIGS. 2A-2B.

As one example, source computer system 102 may be a System i® computer system offered by International Business Machines Corporation located in Armonk, N.Y.

The portion 100-2 of the system in FIG. 1B includes a target computer system 142, which runs a software-based business application 144, which runs programs 146. As one example, target computer system 142 may be a System i® computer system. Although not shown in FIGS. 1A-1B, source computer system 102 (see FIG. 1A) and target computer system 142 (see FIG. 1B) are in communication via a computer network (e.g., a WAN), which allows source computer system 102 (see FIG. 1A) to transfer information to target computer system 142 (see FIG. 1B).

The portion 100-2 of the system for replicating data also includes the following software-based modules: database applying job 148, executing job 150 and object applying job 152. Portion 100-2 of the system for replicating data further includes a database 154, a database journal 156, non-database objects 158, a remote journal 160, and a configuration 162, which are stored on one or more computer data storage media included in target computer system 142. In an alternate embodiment, any of the aforementioned one or more computer data storage media in portion 100-2 may be external to and coupled to target computer system 142.

Remote journal 160 includes the transaction log transferred from database journal 116 (see FIG. 1A). Configuration 162 includes the same data included in configuration 122 (see FIG. 1A) that specifies the jobs that are candidates for job replication. Using the transaction log in remote journal 160 and based on the data in configuration 162 that indicates whether a particular job is a candidate for job replication, database applying job 148 determines whether a change to a data item indicated in remote journal 160 is to be applied to database 154 by database applying job 148, or ignored. If a change to a data item is ignored by database applying job 148, it is because the change will be applied to database 154 as a result of the portion of job replication performed by executing job 150. In a case in which database applying job 148 applies the change to a data item to database 154, the description of the transaction that changed the data item is stored in database journal 156. Details of the functionality of database applying job 148 are described below relative to the discussion of FIGS. 2A-2B.

Executing job 150 receives the job environment that was sent in the runtime environment sending performed by job environment sender 110 (see FIG. 1A). Executing job 150 executes a job that was determined by dispatcher 108 (see FIG. 1A) to be a candidate for job replication. As an example, FIG. 1B shows executing job 150 executing job A 128, which runs program 124 and program 126 in business application 144. Running program 124 in target computer system 142 applies one or more changes to one or more data items to database 154 and description(s) of the transaction(s) that made the one or more changes are stored in database journal 156. Running program 126 in target computer system 142 generates one or more changes to non-database objects 158. Details of the functionality of executing job 150 are described below relative to the discussion of FIGS. 2A-2B.

Target computer system 142 is shown in FIG. 1B as executing one job (i.e., job 128) because the job being executed has been identified by dispatcher 108 (see FIG. 1A) as being a candidate for job replication, and not executing another job (i.e., job 134 (see FIG. 1A)) because the other job has been identified by dispatcher 108 (see FIG. 1A) as not being a candidate for job replication. Another embodiment may have the target computer system 102 executing a plurality of jobs, if the plurality of jobs were all identified by dispatcher 108 (see FIG. 1A) as being candidates for job replication. Although job 128 is shown in FIG. 1B as running exactly two programs, the present invention contemplates that each job executing in target computer system 142 may run any number of one or more programs, and one job may run one number of programs while another job may run another number of programs. The job being executed in the target computer system 142 runs the same number of programs that the same job runs when executed in source computer system 102 (see FIG. 1A).

Object applying job 152 receives the one or more changes to data objects sent by object sender 112 (see FIG. 1A) and applies the change(s) to the target computer system 142 so that the change(s) are stored in non-database objects 158. Details of the functionality of object applying job 152 are described below relative to the discussion of FIGS. 2A-2B.

A synchronization function 164 performs a synchronization of the steps performed by database applying job 148, executing job 150 and object applying job 152. For example, starting the execution of job 128 in the target computer system 142 by executing job 150 is synchronized with database applying job 148 and object applying job 152 using an entries sequence in remote journal 160 and an entries sequence in system audit journal 120 (see FIG. 1A) that is retrieved from source computer system 102 (see FIG. 1A). The synchronization provided by synchronization function 164 ensures that a job executing on the target computer system 142 works with exactly the same data as the job worked with on the source computer system 102 (see FIG. 1).

Process for Replicating Data Using Job Replication

Figure 2A:
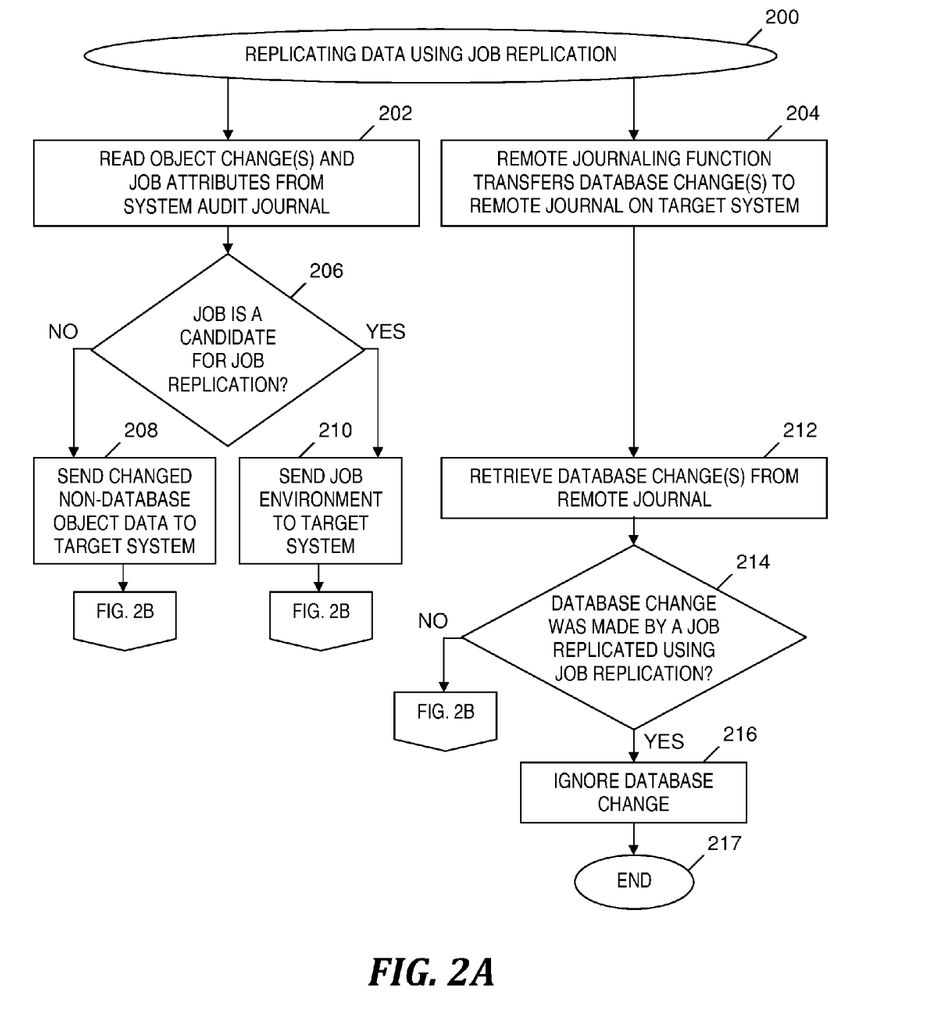
FIGS. 2A-2B is a flowchart of a process of replicating data in the system of FIGS. 1A-1B, in accordance with embodiments of the present invention.
Figure 2B:
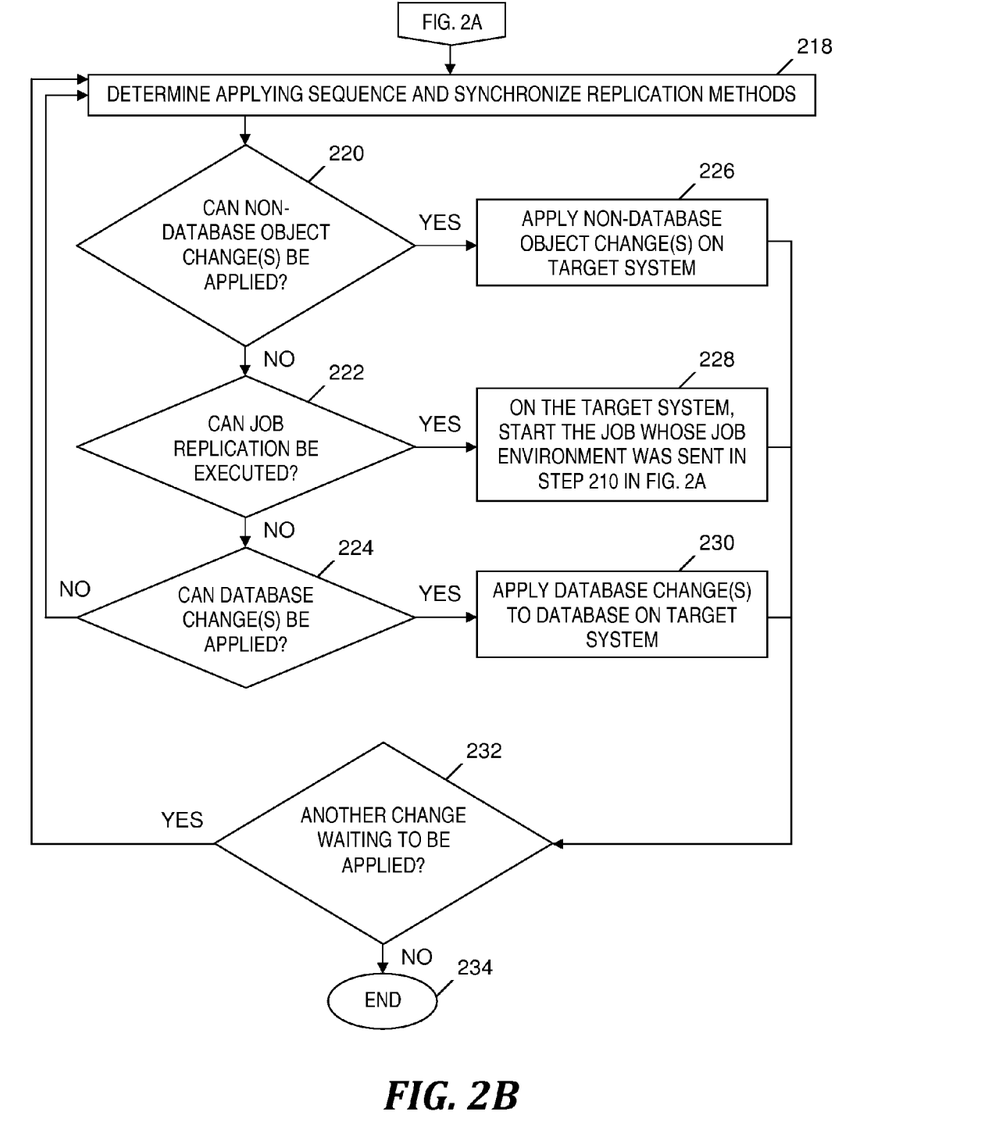

FIGS. 2A-2B is a flowchart of a process of replicating data in the system of FIGS. 1A-1B, in accordance with embodiments of the present invention. The process of replicating data begins at step 200. In step 202, object reader 106 (see FIG. 1A) reads an entry in system audit journal 120 (see FIG. 1A) in order to:

detect a change in a non-database object included in non-database objects 118 (see FIG. 1A), where the change was made by a job (e.g., job 128 in FIG. 1A) executed by source computer system 102 (see FIG. 1A); or detect job execution on source computer system 102 (see FIG. 1A) and retrieve job attributes.

Furthermore, step 202 includes object reader 106 (see FIG. 1A) reading each of one or more other entries in system audit journal 120 (see FIG. 1A) in the same way the entry described above was read to (1) detect a change in a non-database object or (2) detect an execution of a job and retrieve attributes of the job.

As one example of step 202, a change in a non-database object is detected by object reader 106 (see FIG. 1A) reading an entry in system audit journal 120 (see FIG. 1A) having a ZC, CO or DO audit journal entry type provided by an i5/OS® operating system offered by International Business Machines Corporation. As another example of step 202, an execution of a job and the attributes of the executed job are detected by object reader 106 (see FIG. 1A) reading an entry in system audit journal 120 (see FIG. 1A) having a JS or CD audit journal entry type provided by the i5/OS® operating system.

In one embodiment, by reading every entry in system audit journal 120 (see FIG. 1A), step 202 includes detecting the execution and retrieving attributes of all jobs started in source computer system 102 (see FIG. 1A). The jobs whose execution is detected in step 202 include any job that makes non-database object changes that are also detected in step 202, and any job that makes database changes, which may include one or more jobs that make database change(s) while making no non-database object changes.

In one embodiment, in response to each entry of the system audit journal 120 (see FIG. 1A) being read in step 202, object reader 106 (see FIG. 1A) sends the read information to dispatcher 108 (see FIG. 1A) so that step 206 may be performed as described below. Therefore, step 202 may be performing continuously for each new entry in the system audit journal 120 (see FIG. 1A).

In step 204, which may be performed in parallel with step 202, source computer system 102 (see FIG. 1A) runs a remote journaling function to transfer (i.e., send) change(s) (i.e., database change(s)) to data item(s) in database 114 (see FIG. 1A) to target computer system 142 (see FIG. 1B), where the database change(s) were caused by running a job in source computer system 102 (see FIG. 1A). After the aforementioned transfer of the database change(s), target computer system 142 (see FIG. 1B) stores the change(s) to the data item(s) in remote journal 160 (see FIG. 1B) without the change(s) being applied to database 154 (see FIG. 1B) or any other database on target computer system 142 (see FIG. 1B).

The job that runs on source computer system 102 (see FIG. 1A) and causes the aforementioned database change(s) may be the same job that causes non-database change(s) detected in step 202, or the job may be different from the job that causes non-database change(s) detected in step 202. The remote journaling function may be performed continuously in step 204 to send each entry of database journal 116 (see FIG. 1A) to be received by remote journal 160 (see FIG. 1B), while database applying job 148 (see FIG. 1B) continuously reads newly received entries in remote journal 160 (see FIG. 1B) to perform step 212, as described below.

In step 206, for each change to a data object read in step 202, dispatcher 108 (see FIG. 1A) checks configuration 122 (see FIG. 1A) to determine whether the job that generated the change to the data object (e.g., job A 128 in FIG. 1A or job B 134 in FIG. 1A) is a candidate for job replication or whether the changed data object is a candidate for replication by a known approach for data replication. Also, for each job whose execution was detected in step 202, dispatcher 108 (see FIG. 1A) checks configuration 122 (see FIG. 1A) to determine whether the job is a candidate for job replication. A job is a candidate for job replication if dispatcher 108 (see FIG. 1A) determines that configuration 122 (see FIG. 1A) stores a predefined association between an identifier of the job and an indicator that any data object changed by the job should be replicated by job replication instead of by a known approach of data replication. Prior to step 206, configuration 122 (see FIG. 1A) receives and stores the associations between identifiers of jobs and respective indicators that data objects changed by the jobs should be replicated by job replication.

In one embodiment, at the initiation of job replication by the dispatcher 108 (see FIG. 1A) determining that the job is a candidate for job replication, the same data is on the source computer system 102 (see FIG. 1A) and the target computer system 142 (see FIG. 1B).

For a job identifier to be stored in configuration 122 (see FIG. 1A) so that the job is in association with an indicator that the job is a candidate for job replication, the job must fulfill the following requirements:

The job operates only on data already existing on the source computer system 102 (see FIG. 1), and therefore does not interact with users or with other systems;

The job environment of the job is isolated (i.e., there are no other jobs working concurrently on the same data on which the job is working); and The job changes a large volume (i.e., amount) of data (i.e., the job changes a volume of data that exceeds a predefined volume of data, where the predefined volume indicates a large volume of data).

In one embodiment, jobs that are good candidates for replication by job replication include (1) nightly batch jobs, which usually generate the most significant delays, while fulfilling the requirements listed above; and (2) batch jobs that generate reports using Integrated File System (IFS). IFS objects are non-database objects, and therefore replicating the IFS objects using job replication will decrease the volume of transferred data.

If dispatcher 108 (see FIG. 1A) determines in step 206 that the job is not a candidate for job replication, then the No branch of step 206 is followed and step 208 is performed. In step 208, object sender 112 (see FIG. 1A) sends to target computer system 142 (see FIG. 1B) the change(s) to non-database object(s) determined in step 202. Object applying job 152 (see FIG. 1B) receives the change(s) to non-database object(s) that were sent by object sender 112 (see FIG. 1A) in step 208.

If dispatcher 108 (see FIG. 1A) determines in step 206 that the job is a candidate for job replication, then the Yes branch of step 206 is followed and step 210 is performed. In step 210, job environment sender 110 (see FIG. 1A) sends to target computer system 142 (see FIG. 1B) the job environment of the job that was determined to be a candidate for job replication in step 206. Executing job 150 (see FIG. 1B) receives the job environment sent by job environment sender 110 (see FIG. 1A) in step 212. In one embodiment, sending the job environment in step 210 includes source computer system 102 (see FIG. 1A) retrieving an entry from system audit journal 120 (see FIG. 1A) (i.e., an entry of job attributes) and sending the entry to target computer system 142 (see FIG. 1B).

Step 212 follows step 204. In step 212, database applying job 148 (see FIG. 1B) reads remote journal 160 (see FIG. 1B) to retrieve change(s) to data item(s) in database 114 (see FIG. 1A) that had been caused by the execution of the job on source computer system 102 (see FIG. 1A). Again, step 212 may include database applying job 148 (see FIG. 1B) continuously reading entries in remote journal 160 (see FIG. 1B) as the entries are received from database journal 116 (see FIG. 1A) by running the remote journaling function in step 204, as described above. Step 214 follows step 212.

After retrieving the change(s) to data item(s) from remote journal 160 (see FIG. 1B), database applying job 148 (see FIG. 1B) determines in step 214 whether change(s) to data item(s) retrieved from remote journal 160 (see FIG. 1B) was made by a job that was replicated using job replication. To determine in step 214 whether a job was replicated using job replication, database applying job 148 (see FIG. 1B) looks up an identifier of the job in configuration 162 (see FIG. 1B) to determine if configuration 162 (see FIG. 1B) associates the identifier of the job with an indicator that the job is a candidate for job replication.

If database applying job 148 (see FIG. 1B) determines in step 214 that the change to the data item was made by a job that was not replicated by job replication (i.e., the job was determined to be not a candidate for job replication), then the No branch of step 214 is followed. The step following the No branch of step 214 is discussed below.

If database applying job 148 (see FIG. 1B) determines in step 214 that the change to the data item was made by a job that was replicated by job replication (i.e., the job was determined to be a candidate for job replication), then the Yes branch of step 214 is followed and step 216 is performed. In step 216, database applying job 148 (see FIG. 1B) ignores the change to the data item and does not apply the change to the data item to database 154 (see FIG. 1B). Following step 216, the process of FIGS. 2A-2B ends at step 217.

Step 218 is performed after step 208, step 210 and the No branch of step 214. In step 218, synchronization function 164 (see FIG. 1B) determines the sequence in which replicated data can be (and is to be) applied on target computer system 142 (see FIG. 1B). Synchronization function 164 (see FIG. 1B) makes the aforementioned determination of the sequence based on database journal entries sequence retrieved by database applying job 148 (see FIG. 1B) from database journal 116 (see FIG. 1A) and system audit journal sequence retrieved by object reader 106 (see FIG. 1A) from system audit journal 120 (see FIG. 1A) and sent by (1) job environment sender 110 (see FIG. 1A) to executing job 150 (see FIG. 1B) and (2) object sender 112 (see FIG. 1A) to object applying job 152 (see FIG. 1B).

In step 220, synchronization function 164 (see FIG. 1B) determines whether or not the non-database object change(s) sent in step 208 (see FIG. 2A) can be applied on target computer system 142 (see FIG. 1B). If there are one or more waiting database changes and/or one or more waiting job replication executions that should be performed before applying the non-database object change(s) based on the sequence determined in step 218, then the No branch of step 220 is followed and step 222 is performed. If there are no waiting database changes and no waiting job replication executions that should be performed before applying the non-database object change(s) based on the sequence determined in step 218, then the Yes branch of step 220 is followed and step 226 is performed. In step 226, object applying job 152 (see FIG. 1B) applies the non-database object change(s) to a data repository that includes non-database objects 158 (see FIG. 1B). In one embodiment, the data repository to which the non-database object change(s) are applied is a file system, and applying the non-database object change(s) includes restoring or updating objects in the file system.

In step 222, which follows the No branch of step 220, synchronization function 164 (see FIG. 1B) determines whether or not job replication can be executed on target computer system 142 (see FIG. 1B) by the job environment sent in step 210 (see FIG. 2A). If there are one or more waiting database changes and/or one or more waiting non-database object changes that should be performed before executing job replication, based on the sequence determined in step 218, then the No branch of step 222 is followed and step 224 is performed. If there are no waiting database changes and no waiting non-database object changes that should be performed before executing job replication, based on the sequence determined in step 218, then the Yes branch of step 222 is followed and step 228 is performed.

In step 228, executing job 150 (see FIG. 1B) starts the job whose job environment was sent in step 210 (see FIG. 2A). Prior to starting the job in step 228, executing job 150 determines that the following conditions are satisfied:

There are no replication activities in "pending" status.

All object level changes, which preceded the execution of the job on source computer system 102 (see FIG. 1A), are applied on target computer system 142 (see FIG. 1B), based on the entries sequence in system audit journal 120 (see FIG. 1A).

All record level changes, which preceded the execution of the job on source computer system 102 (see FIG. 1A), are applied on target computer system 142 (see FIG. 1B), based on the entries sequence in system audit journal 120 (see FIG. 1A).

Every job which preceded the execution of the job on source computer system 102 (see FIG. 1A) is finished on target computer system 142 (see FIG. 1B) if the job(s) were also replicated using job replication, based on the entries sequence in system audit journal 120 (see FIG. 1A).

In step 224, which follows the No branch of step 222, synchronization function 164 (see FIG. 1B) determines whether or not database change(s) determined via the No branch of step 214 (see FIG. 2A) (hereinafter, simply referred to as "the database change(s)") can be applied on target computer system 142 (see FIG. 1B). If there are one or more waiting non-database object changes and/or one or more waiting job replication executions that should be performed before applying the database change(s), based on the sequence determined in step 218, then the No branch of step 224 is followed and the process of FIGS. 2A-2B loops back to step 218. If there are no waiting non-database object changes and no waiting job replication executions that should be performed before applying the database change(s), based on the sequence determined in step 218, then the Yes branch of step 224 is followed and step 230 is performed. In step 230, database applying job 148 (see FIG. 1B) applies the database change(s) as change(s) to data item(s) in database 154 (see FIG. 1B) in target computer system 142 (see FIG. 1B).

Step 232 is performed after step 226, step 228 and step 230. In step 232, synchronization function 164 (see FIG. 1B) checks if another change is waiting to be applied to target computer system 142 (see FIG. 1B). If there is another change waiting to be applied, then the Yes branch of step 232 is followed and the process loops back to step 218. If there are no other changes waiting to be applied, then the No branch of step 232 is followed and the process of FIGS. 2A-2B ends at step 234.

In one embodiment, the process of FIGS. 2A-2B is performed as part of a replication of the full business application environment of which business application 104 (see FIG. 1A) is a part.

In one embodiment, the process of FIGS. 2A-2B includes the following steps to replace steps 206 and 210 in FIG. 2A and step 224 in FIG. 2B:

Source computer system 102 (see FIG. 1A) determining an entire batch job (e.g., a nightly batch job) is a candidate for replicating job attributes by job replication instead of transferring all data changed by the batch job to the second computer system. Determining the batch job is a candidate for replicating job attributes by job replication is based on source computer system 102 (see FIG. 1) determining that configuration 122 (see FIG. 1A) includes an association between an identifier of the batch job and an indicator that the identified batch job is a candidate for job replication.

Based on the entire batch job being a candidate for replicating job attributes of the batch job by job replication, the source computer system 102 (see FIG. 1A) temporarily suspends the remote journal function that transfers to the target computer system 142 (see FIG. 1B) the changes to data items in database 114 (see FIG. 1A) caused by the batch job. The temporary suspension of the remote journal function lasts until the batch job finishes.

Source computer system 102 (see FIG. 1A) retrieves attributes of the batch job from system audit journal 120 (see FIG. 1A).

Source computer system 102 (see FIG. 1A) sends the retrieved attributes of the batch job to the target computer system 142 (see FIG. 1B) via a computer network as part of instructions that comprise the job environment of the batch job, without sending to the target computer system 142 (see FIG. 1B) the data changed by the batch job. Thus, the amount of data transferred is reduced to an absolute minimum because the only data transferred is the attributes job environment that is replicated to the target computer system 142 (see FIG. 1B) (i.e., in this case, database changes transferred by the remote journaling function are eliminated and there are no data object changes being transferred by object sender 112 in FIG. 1A).

Source computer system 102 (see FIG. 1A) initiates an execution of the batch job by the target computer system 142 (see FIG. 1B) based on the sent attributes of the batch job. The execution of the batch job by target computer system 142 (see FIG. 1B) modifies data in database 154 (see FIG. 1B) and non-database objects 158 (see FIG. 1B) to generate the data changed by the batch job.

In one embodiment, the process of FIGS. 2A-2B includes the following steps prior to step 204:

Source computer system 102 (see FIG. 1A) determines one or more changes (also referred to herein as "database change(s)") to data in a table in database 114 (see FIG. 1A) are replicated to target computer system 142 (see FIG. 1B) only by job replication and not by a direct transfer of the database change(s) to target computer system 142 (see FIG. 1B).

Based on the database change(s) being replicated only by job replication, source computer system 102 (see FIG. 1A) stores the database change(s) to a journal (not shown) that is coupled to source computer system 102 (see FIG. 1A), but is separate from database journal 116 (see FIG. 1A). Thus, in this embodiment, the remote journaling function in step 204 transfers less data because the aforementioned database change(s) are not included in the database journal 116 (see FIG. 1A), but instead are stored in another, separate journal. The database change(s) stored in the separate journal are not transferred to the target computer system 142 (see FIG. 1B), but instead are made in the target computer system 142 (see FIG. 1B) as a result of starting the job in step 228.

Although not shown, the entire process in FIGS. 2A-2B may be repeated with another job executed in source computer system 102 (see FIG. 1A), where the other job runs other programs that change another set of one or more data items in database 114 (see FIG. 1A) and that change another set of non-database objects. The repetition of the process of FIGS. 2A-2B may be repeated for each job of multiple jobs implemented in source computer system 102 (see FIG. 1A).

Following the process of FIGS. 2A-2B, a computer system running a known set of audit tools may check if the source and target computer systems are synchronized (e.g., by using fast comparisons and/or data comparisons).

Although the present invention may avoid sending part of data that would have otherwise been replicated by a traditional data replication approach, the job replication provided by the process of FIGS. 2A-2B may utilize processing resources more intensively than the traditional data replication approach. In one embodiment, the process of FIGS. 2A-2B may include a tuning step by which the network load and the utilization of system resources of target computer system 142 (see FIG. 1B) are balanced by changing data in configuration 122 (see FIG. 1A) to allow more or fewer jobs to be replicated by job replication. The process of FIGS. 2A-2B may also include a step of auditing the effect of the aforementioned tuning by utilizing known performance tools (e.g., performance tools included in the i5/OS® operating system offered by International Business Machines Corporation).

Example

As one example, source computer system 102 (see FIG. 1A) executes job 128 (see FIG. 1A) (hereinafter, "Job A") which runs program 126 (see FIG. 1A) that makes Changes A-1 (i.e., changes to non-database objects 118 (see FIG. 1A)), and also runs program 124 (see FIG. 1A) that makes Changes A-2 (i.e., changes to data items stored in database 114 (see FIG. 1A)). Source computer system 102 (see FIG. 1A) also executes job 134 (see FIG. 1A) (hereinafter, "Job B"), which runs program 132 that makes Changes B-1 (i.e., changes to non-database objects 118 (see FIG. 1A)), and also runs program 130 (see FIG. 1A) that makes Changes B-2 (i.e., changes to data items stored in database 114 (see FIG. 1A)).

Object reader 106 (see FIG. 1A) reads Changes A-1 and Changes B-1 in step 202 (see FIG. 2A). In step 204 (see FIG. 2A), source computer system 102 (see FIG. 1A) runs a remote journaling function that transfers Changes A-2 and Changes B-2 (i.e., the database changes) to target computer system 142 (see FIG. 1B) for storage in remote journal 160 (see FIG. 1B).

Based on configuration 122 (see FIG. 1A) including an association of Job B with an indicator that Job B does not meet the requirements for a job that is suitable for job replication, dispatcher 108 (see FIG. 1A) determines in step 206 (see FIG. 2A) that Job B is not a candidate for job replication, and in response thereto, dispatcher 108 (see FIG. 1A) initiates a known approach to data replication for Job B. Because Job B is not a candidate for job replication, object sender 112 (see FIG. 1A) sends Changes B-1 to target computer system 142 (see FIG. 1B) in step 208 (see FIG. 2A). Subsequently, object applying job 152 (see FIG. 1B) applies Changes B-1 to non-database objects 158 (see FIG. 1B) in step 226 (see FIG. 2B).

Based on configuration 122 (see FIG. 1A) including an association of Job A with an indicator that Job A meets the requirements for a job that is suitable for job replication, dispatcher 108 (see FIG. 1A) determines in step 206 (see FIG. 2A) that job A is a candidate for job replication, and in response thereto, dispatcher 108 (see FIG. 1A) initiates a job replication for job A. Because Job A is a candidate for job replication, job environment sender 110 (see FIG. 1A) sends Changes A-1 to target computer system 142 (see FIG. 1B) in step 210 (see FIG. 2A).

Database applying job 148 (see FIG. 1B) retrieves Changes A-2 and Changes B-2 from remote journal 160 (see FIG. 1B) in step 214 (see FIG. 2A). For each change in Changes A-2, database applying job 148 (see FIG. 1B) looks up the identifier of Job A in configuration 162 (see FIG. 1B) and determines in step 214 (see FIG. 2A) the change was made by a job (i.e., Job A) that was replicated using job replication, and in response thereto, ignores the change in Changes A-2 in step 216 (see FIG. 2A).

For each change in Changes B-2, database applying job 148 (see FIG. 1B) looks up the identifier of Job B in configuration 162 (see FIG. 1B) and determines in step 214 (see FIG. 2A) that the change was made by a job (i.e., Job B) that was not replicated using job replication, and in response thereto, applies the change to database 154 (see FIG. 1B) in step 230 (see FIG. 2B).

Executing job 150 (see FIG. 1B) starts Job A in step 228 (see FIG. 2B) because the environment of Job A was sent to target computer system 142 (see FIG. 1B) in step 212 (see FIG. 2A). Job A runs program 124 (see FIG. 1B) in target computer system 142 (see FIG. 1B) which makes Changes A-2 in database 154 (see FIG. 1B). Furthermore, Job A runs program 126 (see FIG. 1B) in target computer system 142 (see FIG. 1B), which makes Changes A-1 in non-database objects 158 (see FIG. 1B).

Target computer system 142 (see FIG. 1B) runs synchronization function 164 (see FIG. 1B) in step 218 (see FIG. 2B) to synchronize the execution of Job A with database applying job 148 (see FIG. 1B) applying Changes B-2 to database 154 (see FIG. 1B) and with object applying job 152 (see FIG. 1B) applying Changes A-1 and Changes B-1 to non-database objects 158 (see FIG. 1B).

Computer System

Figure 3:
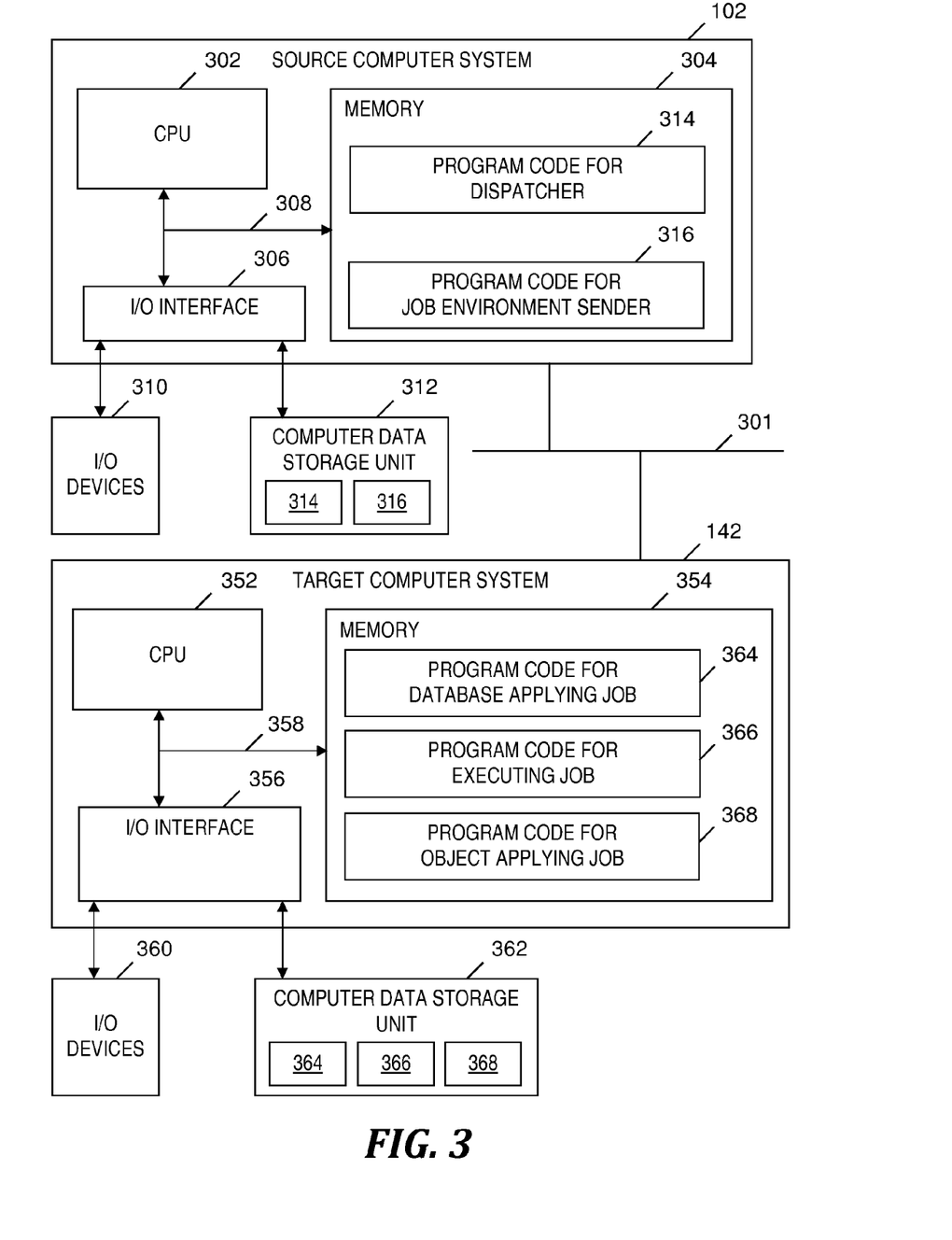
FIG. 3 is a block diagram of a computer system that is included in the system of FIGS. 1A-1B and that implements the process of FIGS. 2A-2B, in accordance with embodiments of the present invention.

FIG. 3 is a block diagram of a computer system that is included in the system of FIGS. 1A-1B and that implements the process of FIGS. 2A-2B, in accordance with embodiments of the present invention. The computer system depicted in FIG. 3 includes source computer system 102 and target computer system 142 in communication via a computer network 301 (e.g., a WAN). Computer system 102 generally comprises a central processing unit (CPU) 302, a memory 304, an input/output (I/O) interface 306, and a bus 308. Further, computer system 102 is coupled to I/O devices 310 and a computer data storage unit 312. Similarly, computer system 142 generally comprises a CPU 352, a memory 354, an I/O interface 356, and a bus 358, and computer system 142 is coupled to I/O devices 360 and a computer data storage unit 362.

CPU 302 and 352 perform computation and control functions of computer system 102 and 142, respectively, including carrying out instructions included in program code for dispatcher 314, program code for job environment sender 316, program code for database applying job 364, program code for executing job 366, and program code for object applying job 368 to perform a method of replicating data. The instructions included in code 314 and 316 are carried out by CPU 302 via memory 304. The instructions included in code 364, 366 and 368 are carried out by CPU 352 via memory 354. CPU 302 and CPU 352 may each comprise a single processing unit, or be distributed across one or more processing units in one or more locations (e.g., on a client and server). In one embodiment, program code 314 includes program code in dispatcher 108 (see FIG. 1A), program code 316 includes program code in job environment sender 110 (see FIG. 1A), program code 364 includes program code in database applying job 148 (see FIG. 1B), program code 366 includes program code in executing job 150 (see FIG. 1B), and program code 368 includes program code in object applying job 152 (see FIG. 1B).

Memory 304 and memory 354 may each comprise any known computer-readable storage medium, which is described below. In one embodiment, cache memory elements of memory 304 and memory 354 provide temporary storage of at least some program code (e.g., program code 314 and program code 316) in order to reduce the number of times code must be retrieved from bulk storage while instructions of the program code are carried out. Moreover, memory 304 and memory 354 may each reside at a respective single physical location, comprising one or more types of data storage, or be distributed across a plurality of physical systems in various forms. Further, memory 304 and memory 354 can each include data distributed across, for example, a local area network (LAN) or a WAN.

I/O interface 306 and I/O interface 356 each comprise any system for exchanging information to or from an external source. I/O devices 310 and I/O devices 360 comprise any known type of external device, including a display device (e.g., monitor), keyboard, mouse, printer, speakers, handheld device, facsimile, etc. Bus 308 and bus 358 each provide a communication link between each of the components in computer system 102, and may each comprise any type of transmission link, including electrical, optical, wireless, etc.

I/O interface 306 and I/O interface 356 also allow computer system 102 and computer system 142, respectively, to store information (e.g., data or program instructions such as program code 314 and program code 316) on and retrieve the information from computer data storage unit 312 and computer data storage unit 362, respectively, or another computer data storage unit (not shown). Computer data storage unit 312 and computer data storage unit 362 may each comprise any known computer-readable storage medium, which is described below. For example, computer data storage unit 312 or computer data storage unit 362 may be a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 and program code 316 that include instructions that are carried out by CPU 302 via memory 304 to replicate data. Memory 354 and/or storage unit 362 may store computer program code 364, 366 and 368 that include instructions that are carried out by CPU 352 via memory 354 to replicate data. Although FIG. 3 depicts memory 304 as including program code 314 and program code 316, the present invention contemplates embodiments in which memory 304 does not include all of code 314 and code 316 simultaneously, but instead at one time includes only a portion of code 314 and/or a portion of code 316. Although FIG. 3 depicts memory 354 as including program code 364, 366 and 368, the present invention contemplates embodiments in which memory 354 does not include all of code 364, 366 and 368 simultaneously, but instead at one time includes only a portion of code 364, a portion of code 366 and/or a portion of code 368.

Further, memory 304 and memory 354 may include other systems not shown in FIG. 3, such as, respectively, an operating system that runs on CPU 302 and provides control of various components within and/or connected to computer system 102, and an operating system that runs on CPU 352 and provides control of various components within and/or connected to computer system 142.

Storage unit 312 and/or one or more other computer data storage units (not shown) that are coupled to computer system 102 may store database 114 (see FIG. 1A), database journal 116 (see FIG. 1A), non-database objects 118 (see FIG. 1A), configuration 122, and system audit journal 120 (see FIG. 1A). Storage unit 362 and/or one or more other computer data storage units (not shown) that are coupled to computer system 142 may store database 154 (see FIG. 1B), database journal 156 (see FIG. 1B), non-database objects 158 (see FIG. 1B), configuration 162 (see FIG. 1B) and remote journal 160 (see FIG. 1B).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 304 and/or computer data storage unit 312; e.g., memory 354 and/or computer data storage unit 362) having computer-readable program code (e.g., program code 314 and 316; e.g., program code, 364, 366 and 368) embodied or stored thereon.

Any combination of one or more computer-readable mediums (e.g., memory 304 and computer data storage unit 312; e.g., memory 354 and/or computer data storage unit 362) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 314 and 316; e.g., program 364, 366 and 368) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 314, 316, 364, 366 and 368) embodied on a computer-readable medium may be transmitted using any appropriate medium, including but not limited to wireless, wireline, optical fiber cable, RF, etc., or any suitable combination of the foregoing.

Computer program code (e.g., program code 314, 316, 364, 366 and 368) for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102, computer system 142 or another computer system (not shown) having components analogous to the components of computer system 102 or computer system 142 included in FIG. 3. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIGS. 1A-1B and FIG. 3), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 314, 316, 364, 366 and 368). These computer program instructions may be provided to one or more hardware processors (e.g., CPU 302 or CPU 352) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 304 or computer data storage unit 312; e.g., memory 354 or computer data storage unit 362) that can direct a computer (e.g., computer system 102 or computer system 142), other programmable data processing apparatus, or other devices to function in a particular manner, such that the instructions (e.g., program code 314 and 316; e.g., program code 364, 366 and 368) stored in the computer-readable medium produce an article of manufacture including instructions which implement the function/act specified in the flowchart and/or block diagram block or blocks.

The computer program instructions may also be loaded onto a computer (e.g., computer system 102 or computer system 142), other programmable data processing apparatus, or other devices to cause a series of operational steps to be performed on the computer, other programmable apparatus, or other devices to produce a computer implemented process such that the instructions (e.g., program code 314 and 316; e.g., program code 364, 366 and 368) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to replicating data. Thus, an embodiment of the present invention discloses a process for supporting computer infrastructure, wherein the process comprises a first computer system providing at least one support service for at least one of integrating, hosting, maintaining and deploying computer-readable code (e.g., program code 314 and 316; e.g., program code 364, 366 and 368) in a second computer system (e.g., computer system 102 or computer system 142) comprising one or more processors (e.g., CPU 302 or CPU 352), wherein the processor(s) carry out instructions contained in the code causing the second computer system to replicate data.

In another embodiment, the invention provides a method that performs the process steps of the invention on a subscription, advertising and/or fee basis. That is, a service provider, such as a Solution Integrator, can offer to create, maintain, support, etc. a process of replicating data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B and the block diagrams in FIGS. 1A-1B and FIG. 3 illustrate the architecture, functionality, and operation of possible implementations of systems, methods, and computer program products according to various embodiments of the present invention. In this regard, each block in the flowchart or block diagrams may represent a module, segment, or portion of code (e.g., program code 314 and 316; e.g., program code 364, 366 and 368), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of replicating data, the method comprising the steps of:

a first computer system determining a first set of changed data objects generated by a job modifying the data objects included in the first computer system has a volume greater than a predefined volume of data objects;

the first computer system determining the job operates only on data existing in the first computer system at a time when an execution of the job by the first computer system is initiated;

the first computer system determining no other jobs are concurrently operating on the data existing in the first computer system;

the first computer system determining the job is a candidate for a job replication, the job modifies data objects in the first computer system to generate the first set of changed data objects, wherein the step of determining the job is the candidate for the job replication is based on the job modifying data objects to generate the first set of changed data objects whose volume is greater than the predefined volume, further based on the job operating only on data existing in the first computer system at the time when the execution of the job by the first computer system is initiated, and still further based on no other jobs concurrently operating on the data existing in the first computer system;

based on the job being the candidate for the job replication, the first computer system initiating the job replication by retrieving attributes of the job;

subsequent to retrieving attributes of the job, the first computer system sending the attributes to a second computer system via a computer network as a part of the job replication, without utilizing a data replication to send the data objects or the first set of changed data objects to the second computer system; and the first computer system initiating an execution of the job by the second computer system based on the sent attributes as another part of the job replication, the execution of the job causing the data objects included in the second computer system to be modified to generate a second set of changed data objects as a replication of the first set of changed data objects.

2. The method of claim 1, further comprising the steps of:

the first computer system sending to the second computer system a first log of transactions of the job causing changes to first data in a first database coupled to the first computer system and a second log of transactions of a second job causing changes to second data in the first database;

the first computer system determining the second job is not a candidate for replicating job attributes of the second job instead of transferring other data changed by the second job to the second computer system;

based on the second job not being the candidate for replicating the job attributes of the second job, the second computer system reading the second log of transactions and applying the second data changed by the transactions in the second log to a second database coupled to the second computer system;

the second computer system determining the transactions in the first log are performed by the job; and based on the job being the candidate for the job replication and based on the transactions in the first log being performed by the job, the second computer system foregoing an application to the second database of the first data changed by the transactions in the first log.

3. The method of claim 1, further comprising the steps of:

the first computer system determining a batch job is a candidate for replicating job attributes of the batch job instead of transferring data changed by the batch job to the second computer system;

based on the batch job being the candidate for replicating job attributes of the batch job, the first computer system suspending a function to transfer to the second computer system changes to data in a database coupled to the first computer system caused by the batch job;

the first computer system retrieving attributes of the batch job;

the first computer system sending the retrieved attributes of the batch job to the second computer system via the computer network without sending to the second computer system data changed by the batch job; and the first computer system initiating an execution of the batch job by the second computer system based on the sent attributes of the batch job, the execution of the batch job modifying data in the second computer system to generate the data changed by the batch job.

4. The method of claim 1, further comprising the steps of:

the first computer system determining a first set of one or more changes to data in a first database coupled to the first computer system by the execution of the job or by an execution of another job;

the first computer system determining a second set of one or more changes to non-database objects in the first computer system by the execution of the other job or by an execution of yet another job; and the first computer system synchronizing the execution of the job by the second computer system based on the sent attributes with an application of the first set of one or more changes in the second computer system and with an application of the second set of one or more changes in the second computer system.

5. The method of claim 1, further comprising the steps of:

the first computer system determining one or more changes to data in a table in a first database are replicated to the second computer system only by the job replication and not by a transfer of the one or more changes to the data in the table to the second computer system; and based on the one or more changes to the data in the table in the first database being replicated only by the job replication, the first computer system journaling the one or more changes to the data in the table to a journal local to the first computer system without sending the one or more changes to the data in the table to a remote journal coupled to the second computer system.

6. A system comprising:

a central processing unit (CPU) of a first computer system;

a memory coupled to the CPU;

a computer-readable, tangible storage device coupled to the CPU, the storage device containing instructions that are carried out by the CPU via the memory to implement a method of replicating data, the method comprising the steps of:

the first computer system determining a first set of changed data objects generated by a job modifying the data objects included in the first computer system has a volume greater than a predefined volume of data objects;

the first computer system determining the job operates only on data existing in the first computer system at a time when an execution of the job by the first computer system is initiated;

the first computer system determining no other jobs are concurrently operating on the data existing in the first computer system;

the first computer system determining the job is a candidate for a job replication, the job modifies data objects in the first computer system to generate the first set of changed data objects, wherein the step of determining the job is the candidate for the job replication is based on the job modifying data objects to generate the first set of changed data objects whose volume is greater than the predefined volume, further based on the job operating only on data existing in the first computer system at the time when the execution of the job by the first computer system is initiated, and still further based on no other jobs concurrently operating on the data existing in the first computer system;

based on the job being the candidate for the job replication, the first computer system initiating the job replication by retrieving attributes of the job;

subsequent to retrieving attributes of the job, the first computer system sending the attributes to a second computer system via a computer network as a part of the job replication, without utilizing a data replication to send the data objects or the first set of changed data objects to the second computer system; and the first computer system initiating an execution of the job by the second computer system based on the sent attributes as another part of the job replication, the execution of the job causing the data objects included in the second computer system to be modified to generate a second set of changed data objects as a replication of the first set of changed data objects.

7. The system of claim 6, further comprising:
a second CPU of the second computer system;
a second memory coupled to the second CPU;
a second computer-readable, tangible storage device coupled to the second CPU, the second storage device containing instructions that are carried out by the second CPU via the second memory to further implement the method of replicating data, the method further comprising the steps of:

the first computer system sending to the second computer system a first log of transactions of the job causing changes to first data in a first database coupled to the first computer system and a second log of transactions of a second job causing changes to second data in the first database;

the first computer system determining the second job is not a candidate for replicating job attributes of the second job instead of transferring other data changed by the second job to the second computer system;

based on the second job not being the candidate for replicating the job attributes of the second job, the second computer system reading the second log of transactions and applying the second data changed by the transactions in the second log to a second database coupled to the second computer system;

the second computer system determining the transactions in the first log are performed by the job; and based on the job being the candidate for the job replication and based on the transactions in the first log being performed by the job, the second computer system foregoing an application to the second database of the first data changed by the transactions in the first log.

8. The system of claim 6, wherein the method further comprises the steps of:

the first computer system determining a batch job is a candidate for replicating job attributes of the batch job instead of transferring data changed by the batch job to the second computer system;

based on the batch job being the candidate for replicating job attributes of the batch job, the first computer system suspending a function to transfer to the second computer system changes to data in a database coupled to the first computer system caused by the batch job;

the first computer system retrieving attributes of the batch job;

the first computer system sending the retrieved attributes of the batch job to the second computer system via the computer network without sending to the second computer system data changed by the batch job; and the first computer system initiating an execution of the batch job by the second computer system based on the sent attributes of the batch job, the execution of the batch job modifying data in the second computer system to generate the data changed by the batch job.

9. The system of claim 6, wherein the method further comprises the steps of:

the first computer system determining a first set of one or more changes to data in a first database coupled to the first computer system by the execution of the job or by an execution of another job;

the first computer system determining a second set of one or more changes to non-database objects in the first computer system by the execution of the other job or by an execution of yet another job; and the first computer system synchronizing the execution of the job by the second computer system based on the sent attributes with an application of the first set of one or more changes in the second computer system and with an application of the second set of one or more changes in the second computer system.

10. The system of claim 6, wherein the method further comprises the steps of:

the first computer system determining one or more changes to data in a table in a first database are replicated to the second computer system only by the job replication and not by a transfer of the one or more changes to the data in the table to the second computer system; and based on the one or more changes to the data in the table in the first database being replicated only by the job replication, the first computer system journaling the one or more changes to the data in the table to a journal local to the first computer system without sending the one or more changes to the data in the table to a remote journal coupled to the second computer system.

11. A computer program product, comprising:
a computer-readable memory; and
a computer-readable program code stored in the computer-readable memory, the computer-readable program code containing instructions that are carried out by a central processing unit (CPU) of a first computer system to implement a method of replicating data, the method comprising the steps of:

the first computer system determining a first set of changed data objects generated by a job modifying the data objects included in the first computer system has a volume greater than a predefined volume of data objects;

the first computer system determining the job operates only on data existing in the first computer system at a time when an execution of the job by the first computer system is initiated;

the first computer system determining no other jobs are concurrently operating on the data existing in the first computer system;

the first computer system determining the job is a candidate for a job replication, the job modifies data objects in the first computer system to generate the first set of changed data objects, wherein the step of determining the job is the candidate for the job replication is based on the job modifying data objects to generate the first set of changed data objects whose volume is greater than the predefined volume, further based on the job operating only on data existing in the first computer system at the time when the execution of the job by the first computer system is initiated, and still further based on no other jobs concurrently operating on the data existing in the first computer system;

based on the job being the candidate for the job replication, the first computer system initiating the job replication by retrieving attributes of the job;

subsequent to retrieving attributes of the job, the first computer system sending the attributes to a second computer system via a computer network as a part of the job replication, without utilizing a data replication to send the data objects or the first set of changed data objects to the second computer system; and the first computer system initiating an execution of the job by the second computer system based on the sent attributes as another part of the job replication, the execution of the job causing the data objects included in the second computer system to be modified to generate a second set of changed data objects as a replication of the first set of changed data objects.

12. The program product of claim 11, further comprising:

a second computer-readable memory in the second computer system; and a second computer-readable program code stored in the second computer-readable memory, the second computer-readable program code containing instructions that are carried out by a second CPU of the second computer system to further implement the method of replicating data, the method further comprising the steps of:

the first computer system sending to the second computer system a first log of transactions of the job causing changes to first data in a first database coupled to the first computer system and a second log of transactions of a second job causing changes to second data in the first database;

the first computer system determining the second job is not a candidate for replicating job attributes of the second job instead of transferring other data changed by the second job to the second computer system;

based on the second job not being the candidate for replicating the job attributes of the second job, the second computer system reading the second log of transactions and applying the second data changed by the transactions in the second log to a second database coupled to the second computer system;

the second computer system determining the transactions in the first log are performed by the job; and based on the job being the candidate for the job replication and based on the transactions in the first log being performed by the job, the second computer system foregoing an application to the second database of the first data changed by the transactions in the first log.

13. The program product of claim 11, wherein the method further comprises the steps of:

the first computer system determining a batch job is a candidate for replicating job attributes of the batch job instead of transferring data changed by the batch job to the second computer system;

based on the batch job being the candidate for replicating job attributes of the batch job, the first computer system suspending a function to transfer to the second computer system changes to data in a database coupled to the first computer system caused by the batch job;

the first computer system retrieving attributes of the batch job;

the first computer system sending the retrieved attributes of the batch job to the second computer system via the computer network without sending to the second computer system data changed by the batch job; and the first computer system initiating an execution of the batch job by the second computer system based on the sent attributes of the batch job, the execution of the batch job modifying data in the second computer system to generate the data changed by the batch job.

14. The program product of claim 11, wherein the method further comprises the steps of:

the first computer system determining a first set of one or more changes to data in a first database coupled to the first computer system by the execution of the job or by an execution of another job;

the first computer system determining a second set of one or more changes to non-database objects in the first computer system by the execution of the other job or by an execution of yet another job; and the first computer system synchronizing the execution of the job by the second computer system based on the sent attributes with an application of the first set of one or more changes in the second computer system and with an application of the second set of one or more changes in the second computer system.

15. The program product of claim 11, wherein the method further comprises the steps of:

the first computer system determining one or more changes to data in a table in a first database are replicated to the second computer system only by the job replication and not by a transfer of the one or more changes to the data in the table to the second computer system; and based on the one or more changes to the data in the table in the first database being replicated only by the job replication, the first computer system journaling the one or more changes to the data in the table to a journal local to the first computer system without sending the one or more changes to the data in the table to a remote journal coupled to the second computer system.

16. A process for supporting computing infrastructure, the process comprising providing at least one support service for at least one of creating, integrating, hosting, maintaining, and deploying computer-readable code in a first computer system comprising a processor, wherein the processor carries out instructions contained in the code causing the first computer system to perform a method of replicating data, wherein the method comprises the steps of:

the first computer system determining a first set of changed data objects generated by a job modifying the data objects included in the first computer system has a volume greater than a predefined volume of data objects;

the first computer system determining the job operates only on data existing in the first computer system at a time when an execution of the job by the first computer system is initiated; and the first computer system determining no other jobs are concurrently operating on the data existing in the first computer system, the first computer system determining the job is a candidate for a job replication, the job modifies data objects in the first computer system to generate the first set of changed data objects, wherein the step of determining the job is the candidate for the job replication is based on the job modifying data objects to generate the first set of changed data objects whose volume is greater than the predefined volume, further based on the job operating only on data existing in the first computer system at the time when the execution of the job by the first computer system is initiated, and still further based on no other jobs concurrently operating on the data existing in the first computer system;

based on the job being the candidate for the job replication, the first computer system initiating the job replication by retrieving attributes of the job;

subsequent to retrieving attributes of the job, the first computer system sending the attributes to a second computer system via a computer network as a part of the job replication, without utilizing a data replication to send the data objects or the first set of changed data objects to the second computer system; and the first computer system initiating an execution of the job by the second computer system based on the sent attributes as another part of the job replication, the execution of the job causing the data objects included in the second computer system to be modified to generate a second set of changed data objects as a replication of the first set of changed data objects.

\* \* \* \* \*